(12) United States Patent
Seo (10) Patent No.: US 7,352,477 B2
(45) Date of Patent: Apr. 1, 2008

(54) TWO DIMENSIONAL POSITION DETECTING DEVICE

(75) Inventor: Shuzo Seo, Saitama (JP)

(73) Assignee: PENTAX Corporation, Tokyo (JP)

( * ) Notice: Subject to any disclaimer, the term of this patent is extended or adjusted under 35 U.S.C. 154(b) by 41 days.

(21) Appl. No.: 11/275,441

(22) Filed: Jan. 3, 2006

(65) Prior Publication Data
US 2006/0250504 A1 Nov. 9, 2006

(30) Foreign Application Priority Data
Jan. 7, 2005 (JP) ............................. 2005-002546

(51) Int. Cl.
*G01B 11/14* (2006.01)
*G01B 11/26* (2006.01)
*G01B 17/00* (2006.01)

(52) U.S. Cl. .............. 356/614; 356/139.03; 250/201.2; 396/125

(58) Field of Classification Search ............................... 356/139.01–139.03, 152, 141, 614; 250/201.1, 250/201.2, 201.3; 396/125; 345/158
See application file for complete search history.

(56) References Cited

U.S. PATENT DOCUMENTS

| | | | | |
|---|---|---|---|---|
| 4,193,689 A | * | 3/1980 | Reymond et al. | 356/139.03 |
| 4,639,588 A | * | 1/1987 | Shinoda | 250/201.2 |
| 4,905,315 A | * | 2/1990 | Solari et al. | 318/640 |
| 5,118,185 A | * | 6/1992 | Courten | 356/139.03 |
| 5,438,190 A | * | 8/1995 | Kaneda et al. | 250/201.3 |
| 6,081,255 A | * | 6/2000 | Narabu | 345/158 |
| 6,826,363 B2 | * | 11/2004 | Taka | 396/125 |
| 2003/0067544 A1 | | 4/2003 | Wada | |
| 2005/0157287 A1 | | 7/2005 | Seo | |
| 2005/0190267 A1 | | 9/2005 | Uenaka et al. | |
| 2005/0276589 A1 | | 12/2005 | Seo | |
| 2006/0007320 A1 | | 1/2006 | Seo | |
| 2006/0017818 A1 | | 1/2006 | Enomoto | |

FOREIGN PATENT DOCUMENTS

| | | |
|---|---|---|
| JP | 10-142649 | 5/1998 |
| JP | 11-072815 | 3/1999 |
| JP | 2001-117129 | 4/2001 |

OTHER PUBLICATIONS

U.S. Appl. No. 11/255,946 to Seo, which was filed on Oct. 24, 2005.
English language Abstract of JP 10-142649.
English language Abstract of JP 11-072815.
English language Abstract of JP 2001-117129.

* cited by examiner

*Primary Examiner*—Sang H. Nguyen
(74) *Attorney, Agent, or Firm*—Greenblum & Bernstein, P.L.C.

(57) ABSTRACT

A two-dimensional position detecting device includes a movable member which relatively moves parallel to a stationary member; a light source and a two-dimensional position sensor which are fixed to one and the other of the stationary member and the movable member, respectively, the two-dimensional position sensor receiving light emitted from the light source to detect a light-receiving point on a light receiving surface of the two-dimensional position sensor; and a reducing projector optical system, positioned between the light source and the two-dimensional position sensor, for converging the light that is emitted from the light source on the light receiving surface of the two-dimensional position sensor.

18 Claims, 8 Drawing Sheets

TWO DIMENSIONAL POSITION DETECTING DEVICE

BACKGROUND OF THE INVENTION

1. Field of the Invention

The present invention relates to a two-dimensional position detecting device for detecting the position of an object which moves in a plane.

2. Description of the Prior Art

A two-dimensional position detecting device including a two-dimensional position sensitive device (two-dimensional position sensor) (PSD) and a light source (LED) which are respectively mounted to one and the other of a stationary member and a movable member so as to face each other in order to detect the position of incident light, which is emitted from the light source to be incident on the two-dimensional position sensor, to thereby detect the position of the movable member relative to the stationary member is known in the art as a position detecting device for detecting the position of a moving object in a plane within a maximum moving range of the order of a few millimeters. This type of position detecting device is disclosed in Japanese unexamined patent publication No. 2001-117129.

However, in a conventional two-dimensional position sensor, the effective length and width (the effective area) of the light receiving surface is only about two millimeters. Therefore, in the conventional detection method using a light source and a two-dimensional position sensor that are arranged so as to face each other, the position of the movable member relative to the stationary member can only be detected within a small operating area which corresponds to the two-dimensional area of the light receiving surface of the two-dimensional position sensor.

SUMMARY OF THE INVENTION

The present invention has been devised in view of the aforementioned problem occurring in a conventional two-dimensional position detecting device, and provides a two-dimensional position detecting device which can detect the position of a movable member relative to a stationary member even when the movable member moves relative to the stationary member by a distance over the effective length or the effective width of the light receiving surface of the two-dimensional position sensor, i.e., even when the movable member moves relative to the stationary member over the aforementioned two-dimensional area of the light receiving surface of the two-dimensional position sensor.

According to an aspect of the present invention, a two-dimensional position detecting device is provided, including a movable member which relatively moves parallel to a stationary member; a light source and a two-dimensional position sensor which are fixed to one and the other of the stationary member and the movable member, respectively, the two-dimensional position sensor receiving light emitted from the light source to detect a light-receiving point on a light receiving surface of the two-dimensional position sensor; and a reducing projector optical system, positioned between the light source and the two-dimensional position sensor, for converging the light that is emitted from the light source on the light receiving surface of the two-dimensional position sensor.

It is desirable for the reducing projector optical system to include an imaging lens positioned so that a distance between the imaging lens and the light source is greater than a distance between the imaging lens and the two-dimensional position sensor.

It is desirable for the movable member to include a movable stage of an image shake correction stage apparatus, and for the movable stage to be supported by a first support device in a manner to allow the movable stage to move freely in one of two axial directions perpendicular to each other relative to the stationary member, and for the movable stage to be further supported by the stationary member via a second support device to allow the first support device and the movable stage to integrally move linearly in the other of the two axial directions.

It is desirable for the reducing projector optical system to include an imaging lens and an adjuster for moving the image lens in a small moving range for fine focus adjustment.

It is desirable for the image shake correction stage apparatus to be incorporated in a digital camera.

It is desirable for the camera to include an X-direction actuator which moves the movable stage in the one of the two axial directions relative to the stationary member; a Y-direction actuator which moves the first support device and the movable stage in the other of the two axial directions relative to the stationary member; and a controller for driving the X-direction actuator and the Y-direction actuator in accordance with an output of the two-dimensional position sensor to stabilize an object image which is formed on an image pickup device through a photographing optical system of the camera.

It is desirable for the first support device and the second support device to include a substantially U-shaped guide shaft which includes a guide shaft extending in the other of the two axial directions and two parallel guide shafts extending in the one of the two axial directions.

It is desirable for the adjuster to include two hollow-cylindrical members, wherein one of the two hollow-cylindrical members is fixed to the two-dimensional position sensor and the other of the two hollow-cylindrical members supports the imaging lens; and a position of the imaging lens in the optical axis direction thereof is finely adjusted via a sliding movement between the one and the other of the two hollow-cylindrical members.

It is desirable for the adjuster to include two hollow-cylindrical members which are engaged with each other via male and female helicoidal threads, wherein one of the two hollow-cylindrical members is fixed to the two-dimensional position sensor and the other of the two hollow-cylindrical members supports the imaging lens; and a position of the imaging lens in the optical axis direction thereof is finely adjusted via a relative rotational movement between the one and the other of the two hollow-cylindrical members.

According to the present invention, the moving amount of a converged point of the light source becomes smaller than the moving amount of the light source, which makes it possible to detect the position of the light source in a range greater than the light receiving surface of the two-dimensional position sensor.

The present disclosure relates to subject matter contained in Japanese Patent Application No. 2005-002546 (filed on Jan. 7, 2005) which is expressly incorporated herein in its entirety.

BRIEF DESCRIPTION OF THE DRAWINGS

The present invention will be discussed below in detail with reference to the accompanying drawings, in which.

DESCRIPTION OF THE PREFERRED EMBODIMENTS

Figure 1:
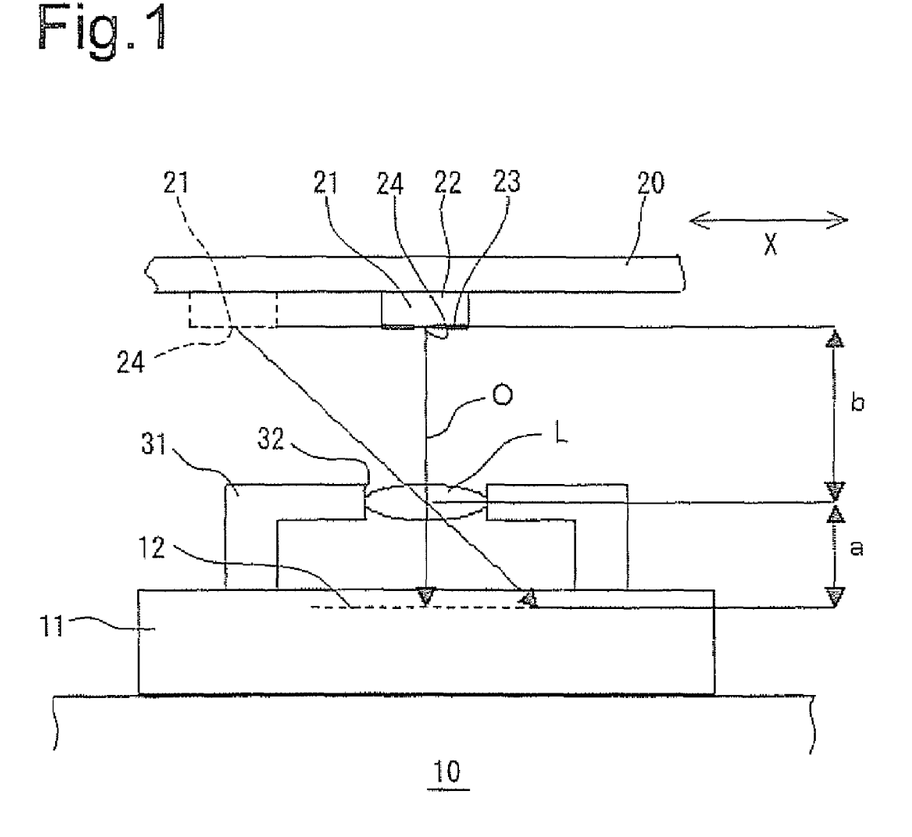
FIG. 1 is a longitudinal sectional view of an embodiment of a two-dimensional position detecting device to which the present invention is applied, showing important portions of the device.

FIG. 1 shows a longitudinal sectional view of an embodiment of a two-dimensional position detecting device to which the present invention is applied. This embodiment is constructed so as to be capable of detecting the two-dimensional position of a movable member which moves parallel and relative to a stationary member in two axial directions (X and Y directions) perpendicular to each other.

The two-dimensional position detecting device is provided with a stationary board 10 and a movable board (movable stage) 20 which is positioned parallel to the stationary board 10. The movable board 20 is supported by a guide structure (not shown) to be linearly movable, parallel to the stationary board 10, in both an X-direction (shown by a double-headed arrow in FIG. 1) along the page of FIG. 1 and a Y-direction perpendicular to the page of FIG. 1. A two-dimensional position sensor (PSD) 11 is fixed to the stationary board 10 so that a light receiving surface 12 of the two-dimensional position sensor 11 is parallel to a plane in which the movable board 20 moves. A light source 21 is fixed to the movable board 20 at a position thereon which faces the light receiving surface 12 of the two-dimensional position sensor 11.

A lens L serving as a reducing projector optical system is installed between the two-dimensional position sensor 11 and the light source 21 at a position away from the light receiving surface 12 toward the movable board 20 by a first predetermined distance "a" (see FIG. 1). The lens L is fixed to a lens holder 31 in an opening 32 thereof. The lens holder 31 is formed so as to have a hollow cylindrical shape which surrounds the light receiving surface 12 in a manner to prevent light from being incident on the light receiving surface 12 from the periphery of the lens holder (i.e., the lens holder only allows light to be incident on the light receiving surface 12 via the lens L). The lens L is positioned so that an optical axis O thereof passes through the center of the light receiving surface 12 in a direction perpendicular (normal) to the light receiving surface 12.

The light source 21 is provided with an LED 22 and a spot mask 23 having a pin hole 24. The spot mask 23 is positioned on a light emitting surface of the LED 22. The spot mask 23 is fixed to the light emitting surface of the LED 22 so that the pin hole 24 faces the center of the LED 22. Accordingly, light emitted from the LED 22 is projected toward the lens L through the pin hole 24 so that the pin hole 24 serves as a secondary light source.

The pin hole 24 and the lens L are apart from each other by a second predetermined distance "b" (see FIG. 1). In the illustrated embodiment of the two-dimensional position detecting device, the first predetermined distance "a" is smaller than the second predetermined distance "b" (a<b). If the focal length of the lens L is designated as "f", the first predetermined distance "a", the second predetermined distance "b" and the focal length "f" are predetermined so that the imaging formula of the lens L holds. Therefore, the light which exits out from the pin hole 24 to be incident on the lens L is converged on the light receiving surface 12 via the lens L; namely, a secondary light-source image 24$i$ is projected onto the light receiving surface 12 as an image (light-receiving point) of the pin hole 24.

Figure 2:
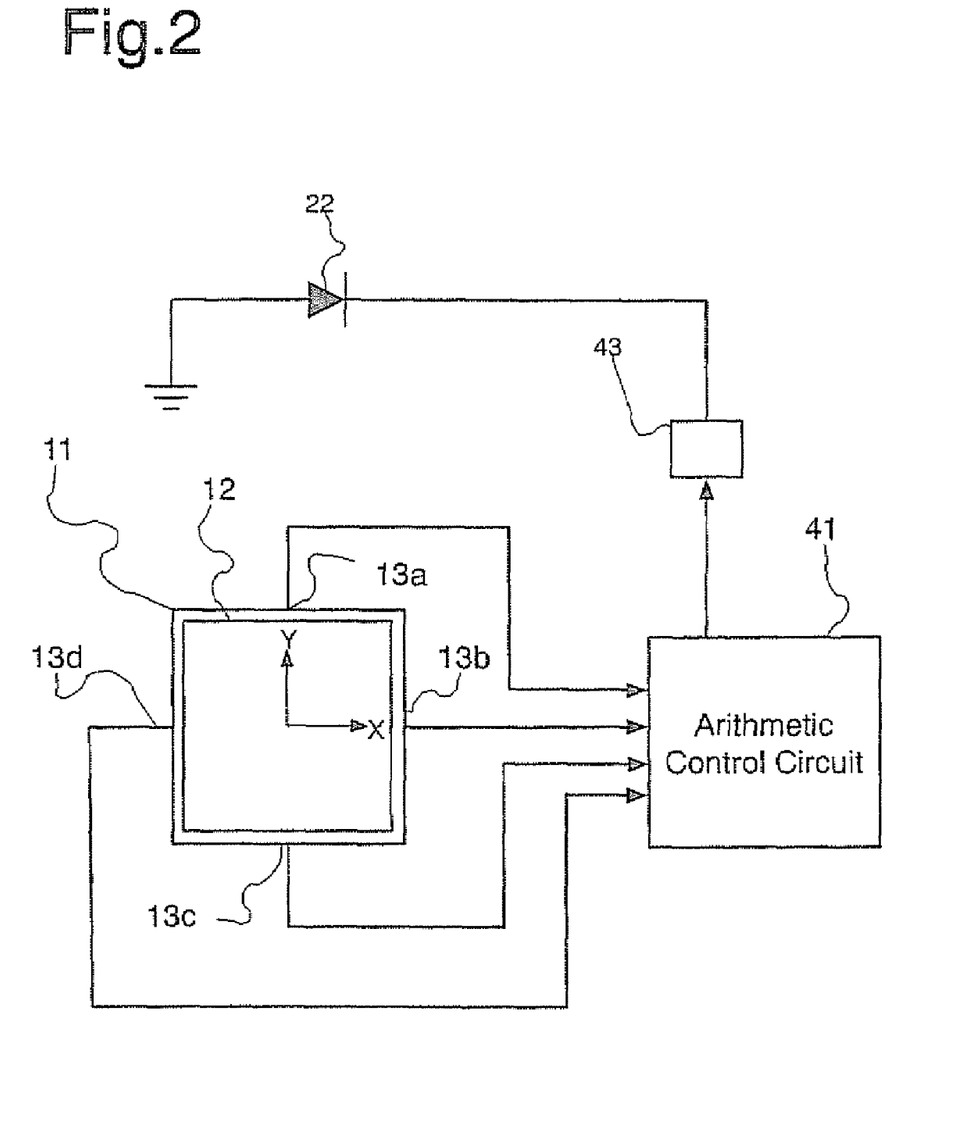
FIG. 2 is a schematic block diagram of a circuit of the two-dimensional position detecting device shown in FIG. 1.

FIG. 2 shows the light receiving surface 12 of the two-dimensional position sensor 11 and the configuration of a position detecting circuit of the two-dimensional position detecting device. The LED 22 is lit by a drive circuit 43, the operation of which is controlled by an arithmetic control circuit (controller) 41. The two-dimensional position sensor 11 outputs from four output terminals 13$a$, 13$b$, 13$c$ and 13$d$ detection signals (currents) corresponding to a position on the light receiving surface 12 at which the two-dimensional position sensor 11 receives the secondary light-source image 24$i$ in a state where the LED 22 remains lit. The detection signals output from the four output terminals 13$a$ through 13$d$ are input to the arithmetic control circuit 41. The arithmetic control circuit 41 calculates the incident point of the secondary light-source image 24$i$ on the light receiving surface 12 by a predetermined operation in accordance with the detection signals output from the four output terminals 13$a$ through 13$d$, and further calculates a distance X0 from the origin point to the incident point in the X-direction and a distance Y0 from the origin point to the incident point in the Y-direction.

In the present embodiment of the two-dimensional position detecting device, the lateral magnification m by the lens L becomes b/a times. Therefore, if each of the aforementioned calculated distances x0 and y0 is multiplied by the lateral magnification m, a moving distance Δx and a moving distance Δy of the light source 21 from the origin point in the X-direction and the Y-direction, respectively, and the x and y coordinates of the light source 21 with respect to the origin point can be determined. In addition, from the determined moving distances Δx and Δy, the moving distance of the light source 21 and the moving direction thereof can be determined, or movement or positional information on the light source 21 such as the coordinates thereof can be determined. For instance, such determined information are visually indicated on an indicating device or used for position control. Parameters such as the lateral magnification m which are necessary for detecting the position of the light source 21 are written in a memory beforehand which is integrated in the arithmetic control circuit 41.

In this manner, according to the illustrated embodiment of the two-dimensional position detecting device to which the present invention is applied, the range of movement for measurement of the light source 21 in the X-direction and the Y-direction can be enlarged to be m-times (b/a times) of the X-direction length and the Y-direction length (the length and width) of the light receiving surface 12.

Additionally, the range of movement for measurement of the light source 21 can be changed by changing the lateral magnification m, and the lateral magnification m can be set in accordance with the range of movement for measurement of the light source 21.

Figure 7:
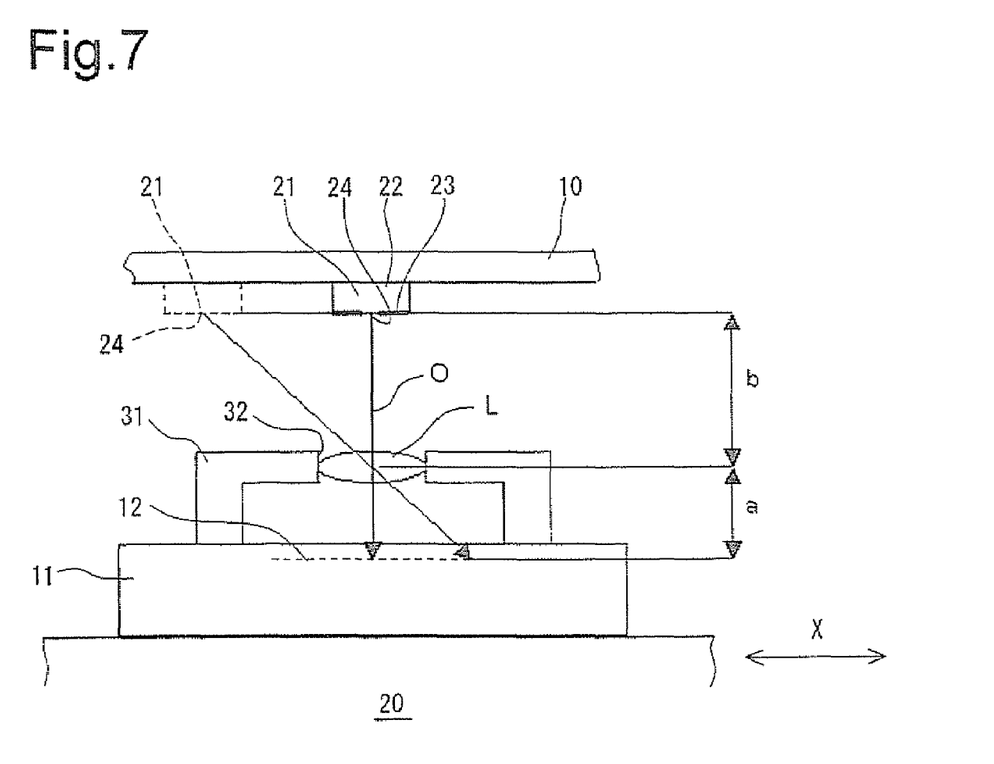
FIG. 7 is a longitudinal sectional view of another embodiment of a two-dimensional position detecting device to which the present invention is applied, showing important portions of the device.

Although in the above illustrated embodiment of the two-dimensional position detecting device the two-dimensional position sensor 11 and the light source 21 are fixed to the stationary board 10 and the movable board 20, respectively, the light source 21 and the two-dimensional position sensor 11 can be fixed to the stationary board 10 and the movable board 20, respectively, in another embodiment of the two-dimensional position detecting device, as shown in FIG. 7.

Figures 3A, 3B, 3C:
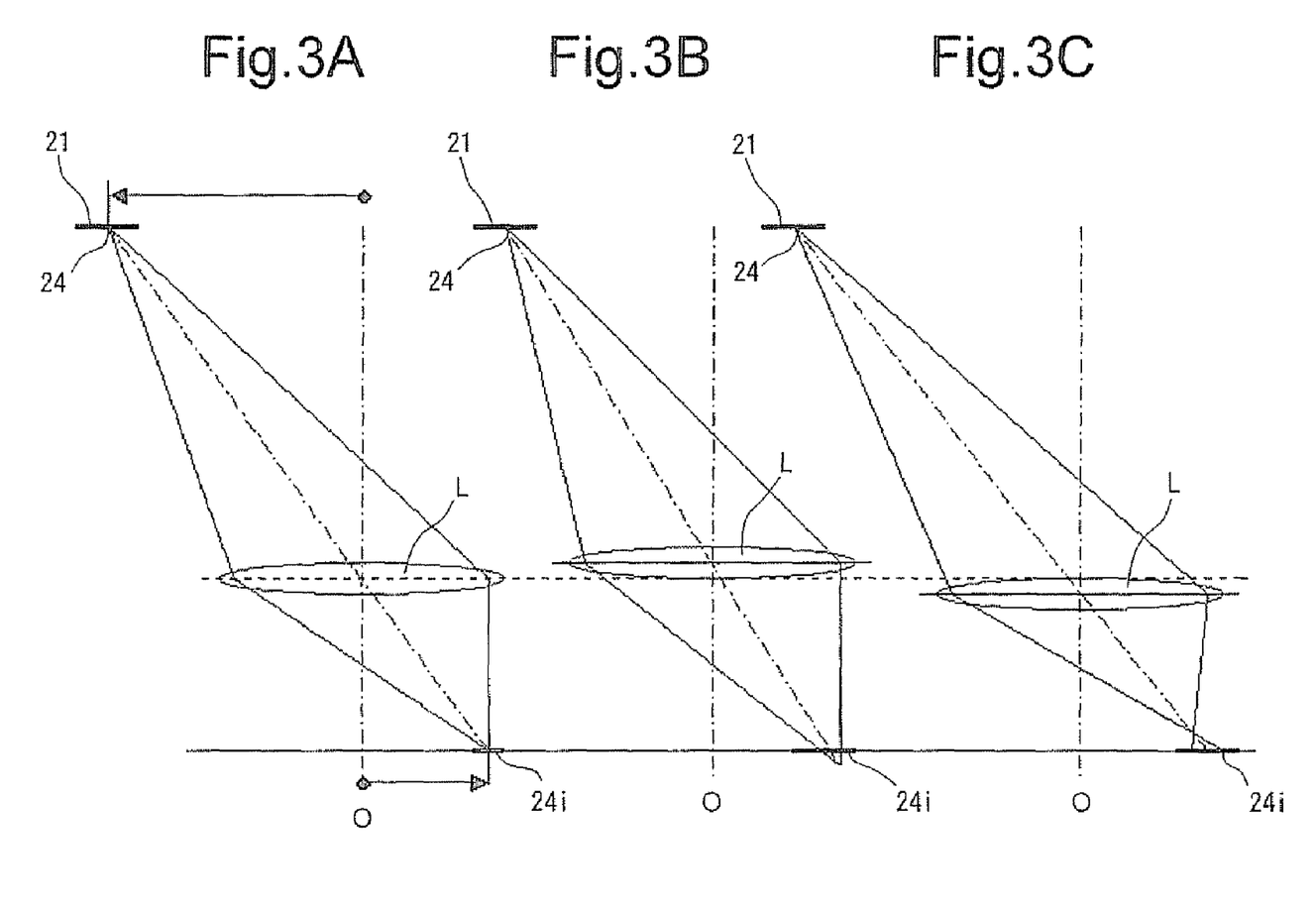
FIGS. 3A, 3B and 3C each show a longitudinal sectional view of a portion of another embodiment of the two-dimensional position detecting device to which the present invention is applied.

There is a possibility of the secondary light-source image 24i deviating from the light receiving surface 12 as shown in FIG. 3B or 3C due to a manufacturing error and/or an assembling error. FIG. 3A shows a state (correct state) where the secondary light-source image 24i is properly formed on the light receiving surface 12, FIG. 3B shows a state (incorrect state) where the secondary light-source image 24i is formed in front of the light receiving surface 12, and FIG. 3C shows a state (incorrect state) where the secondary light-source image 24i is formed behind the light receiving surface 12.

Figure 8:
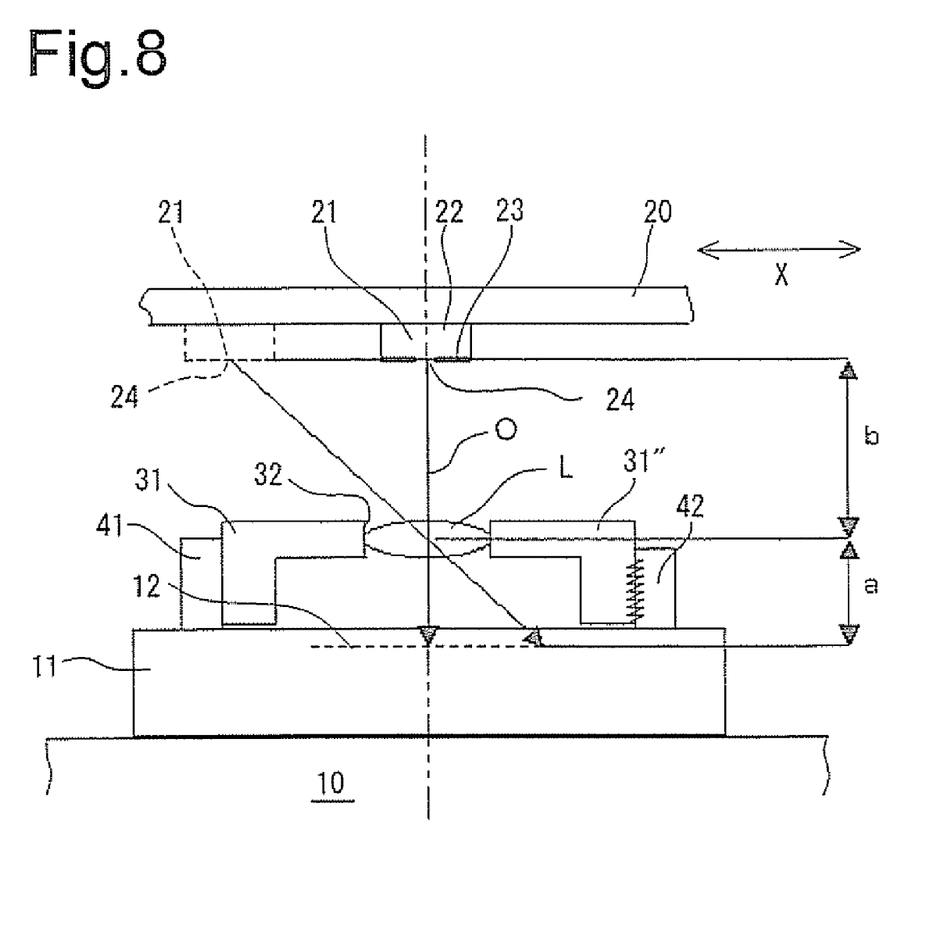
FIG. 8 is a longitudinal sectional view of another embodiment of a two-dimensional position detecting device to which the present invention is applied, showing two alternative structures in which a focus adjustment of the lens is possible.

To overcome this problem, another embodiment of the two-dimensional position detecting device can be provided in which the lens L is movable along the optical axis thereof to make a focus adjustment of the lens L possible. For instance, as shown in the structure on the left side in FIG. 8, the lens holder 31 can be constructed from two hollow-cylindrical members 31' and 41 (which also constitutes an adjuster) which are slidably engaged with each other to have a telescopic structure, wherein one and the other of the two hollow-cylindrical members 31' and 41 are fixed to the two-dimensional position sensor 11 and the lens L, respectively, so that a focal point of the lens L can be adjusted by moving the lens L forward or reverse along the optical axis thereof by advancing or retracting the hollow-cylindrical member 31' fixed to the lens L within the other hollow-cylindrical member 41. Alternatively, as shown in the structure on the right side in FIG. 8,[a1] the lens holder 31 can be constructed from two hollow-cylindrical members 31" and 42 (which also constitutes an adjuster) which are engaged with each other via male and female helicoidal threads, wherein one and the other of the two hollow-cylindrical members 31" and 42 are fixed to the two-dimensional position sensor 11 and the lens L, respectively, so that a focal point of the lens L can be adjusted by moving the lens L forward or reverse along the optical axis thereof by rotating the other hollow-cylindrical member 31" or 42, to which the lens L is fixed. Alternatively, it is possible to apply a fine-adjustment mechanism to the light source 21 to attain a similar effect. In this case, since there is a possibility of the lateral magnification m varying by a focus adjustment, it is desirable for the lateral magnification m is measured to be set as a parameter after the lens L is fixed.

Figure 4:
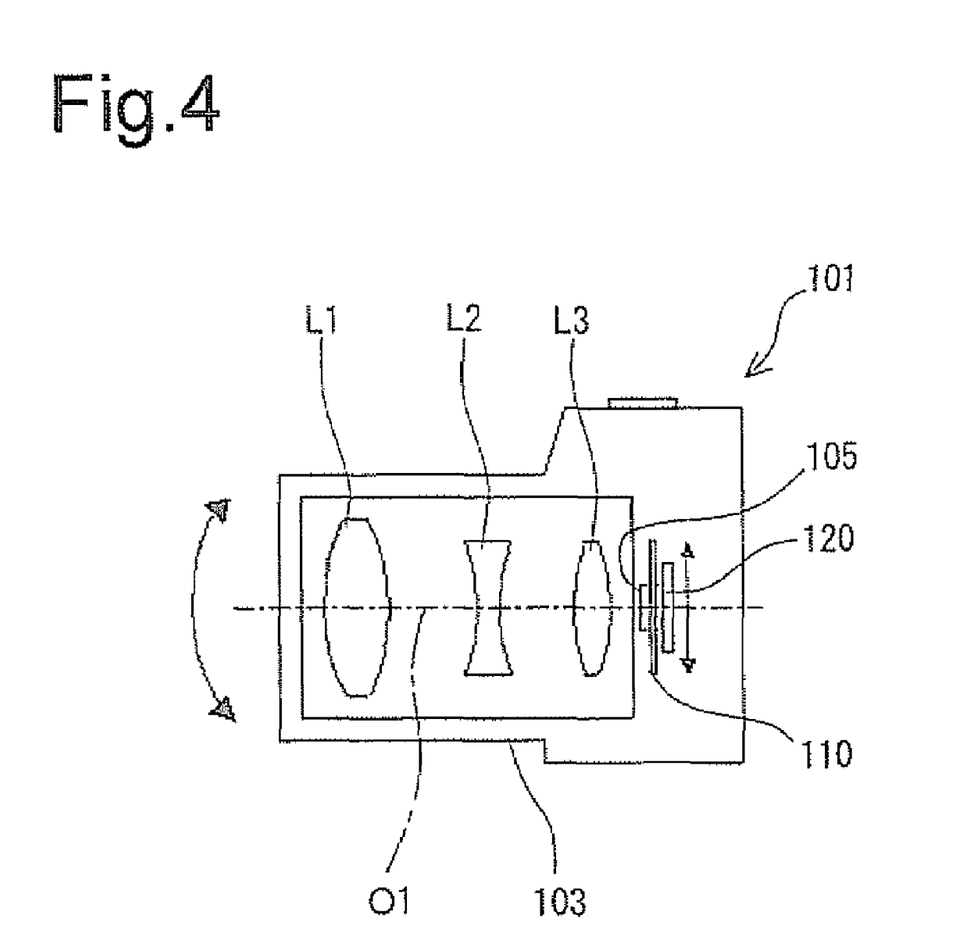
FIG. 4 is a longitudinal sectional view of an embodiment of a digital camera which incorporates an image shake correction stage apparatus to which the present invention is applied.
Figure 5:
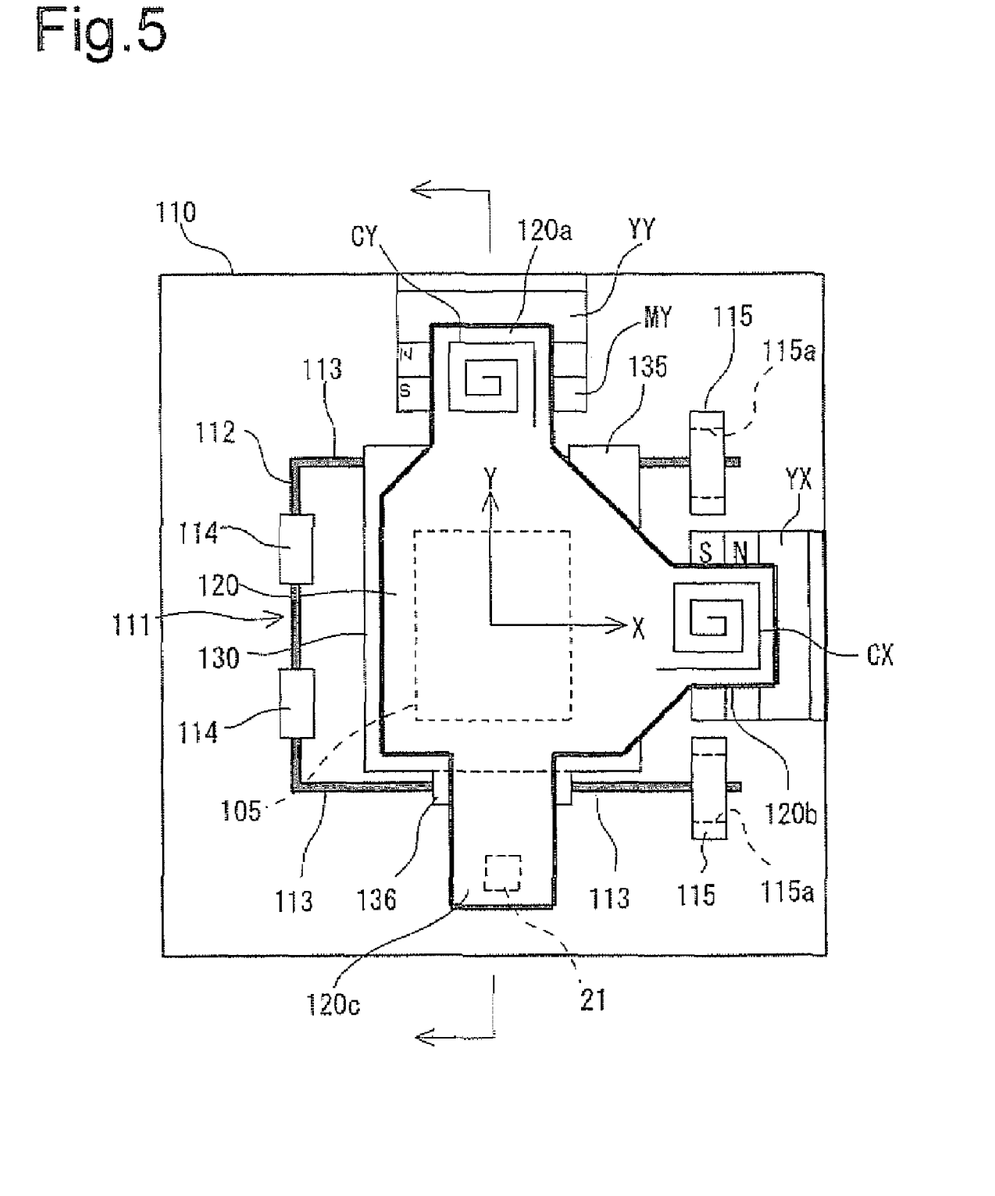
FIG. 5 is a rear elevational view of a portion of the image shake correction stage apparatus shown in FIG. 4.
Figure 6:
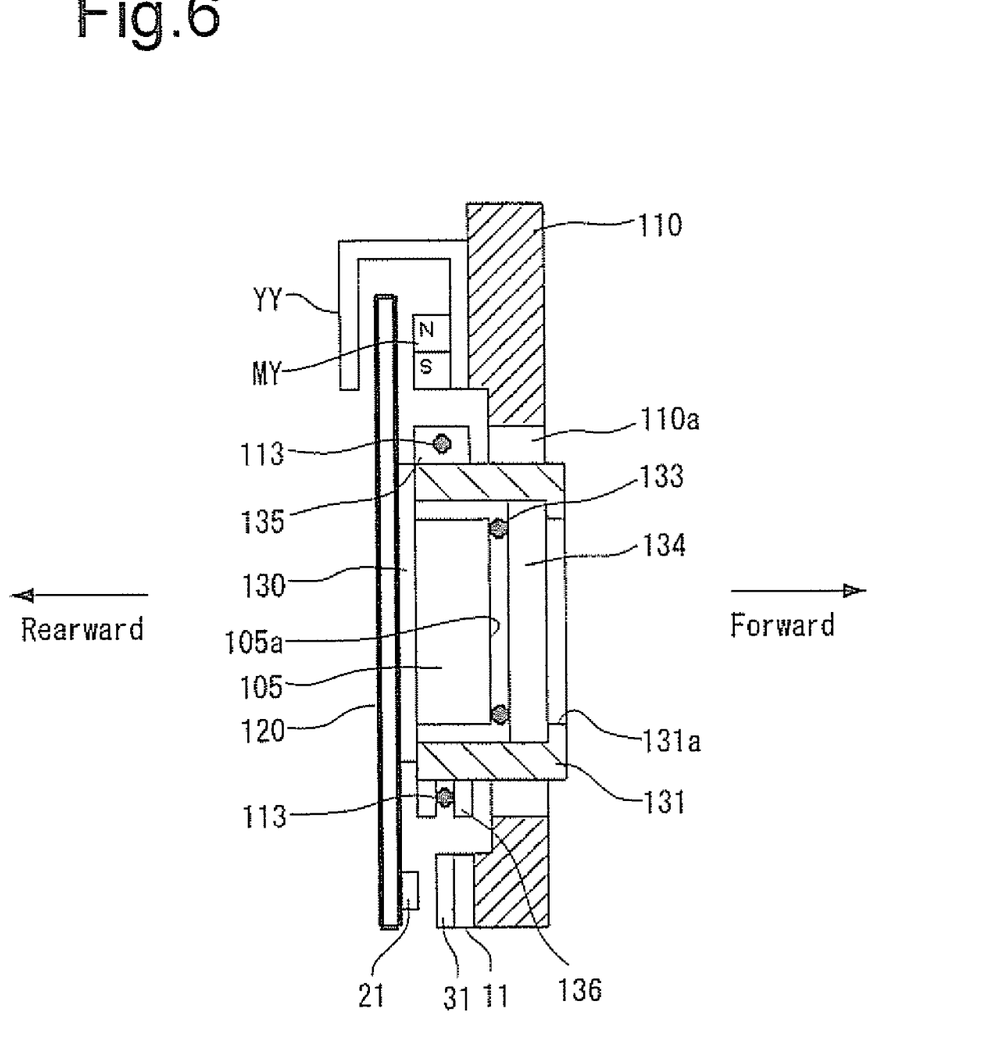
FIG. 6 is a cross sectional view taken along VI-VI line shown in FIG. 5.

A specific embodiment which incorporates a two-dimensional position detecting device according to the present invention will be discussed hereinafter. FIGS. 4 through 6 show an embodiment of a digital camera 101 which incorporates an image shake correction stage apparatus including the two-dimensional position detecting device shown in FIG. 1, wherein the image shake correction stage apparatus counteracts image shake due to vibrations such as hand shake (camera shake) by moving an image pickup device of the digital camera 101. FIG. 4 is a longitudinal sectional view of the digital camera 101 that incorporates the image shake correction stage apparatus including the two-dimensional position detecting device shown in FIG. 1. The digital camera (body) 101 is provided therein with a photographic lens 103 which includes a photographing optical system having a plurality of lenses L1, L2 and L3. An image pickup device 105 is provided behind the lens L3. An object image is focused onto an imaging surface 105a of the image pickup device 105 through the photographic lens 103. The image pickup device 105 is held by the image shake correction stage apparatus, and is positioned so that an optical axis O1 of the photographic lens 103 passes through the center of the imaging surface 105a in a direction perpendicular thereto and so that the imaging surface 105a is coincident with a predetermined image plane (determined at the design stage) of the photographic lens 103.

The image shake correction stage apparatus is provided with a printed board 120 serving as a movable stage (movable board/movable member) which is supported to be movable parallel to a stationary board 110, that is fixed to the digital camera 101, in two axial directions (X and Y directions) perpendicular to each other relative to the stationary board 110. The image pickup device 105 is mounted to the printed board 120. The light source 21 and the two-dimensional position sensor 11 are fixed to the printed board 120 and the stationary board 110, respectively, to serve as elements of a two-dimensional position detecting device for position detection in directions perpendicular to the optical axis of the image pickup device 105.

The digital camera 101 is further provided with a vertical/horizontal angular velocity sensor (not shown) for detecting vibrations of the optical axis O1 of the photographic lens 103. The image shake correction stage apparatus operates to move the image pickup device 105 together with the printed board 120 so that an object image formed on the imaging surface 105a does not move relative to the imaging surface 105a regardless of vibrations of the optical axis O1 of the photographic lens 103 which are detected by the vertical/horizontal angular velocity sensor.

In this image shake correcting operation of the image shake correction stage apparatus, the two-dimensional position detecting device according to the present invention that includes the two-dimensional position sensor 11 and the light source 21 is used to detect the direction of movement of the image pickup device 105 and the moving amount thereof which are calculated based on the result of detection of the vertical/horizontal angular velocity sensor.

The structure of the present embodiment of the image shake correction stage apparatus will be further discussed in detail with reference to FIGS. 5 and 6.

A substantially U-shaped X-Y direction guide shaft 111 which consists of a Y-direction guide shaft 112 and two parallel X-direction guide shafts 113 is supported by the stationary board 110 thereon to be freely movable in the Y-direction along the Y-direction guide shaft 112. The Y-direction guide shaft 112 is supported to be freely movable in the Y-direction, while the two parallel X-direction guide shafts 113 respectively extend from the opposite ends of the Y-direction guide shaft 112 in the X-direction, is the X-direction extending perpendicular to the Y-direction. The Y-direction guide shaft 112 of the X-Y direction guide shaft 111 are slidably engaged in two bearings 114 to be supported thereby. The two bearings 114 are fixed to the stationary board 110 at two positions away from each other in the Y-direction by a predetermined distance.

The two X-direction guide shafts 113 are slidably engaged, at the free ends thereof, in elongated holes 115a of two bearings 115 to be supported thereby, respectively. The two bearings 115 are likewise fixed to the stationary board 110. The elongated holes 115a of the two bearings 115 are elongated in the Y-direction.

A base plate 130 is supported by the two X-direction guide shafts 113 to be movable together with the two X-direction guide shaft 113 in the Y-direction and to be freely movable in the X-direction along the two X-direction guide shafts 113 relative to the two X-direction guide shafts 113. Namely, the base plate 130 is supported by the two X-direction guide shafts 113 to be freely movable in the X-direction along the two X-direction guide shafts 113, and is guided in the Y-direction to be freely movable in the Y-direction by the bearings 114 and the elongated holes 115a of the two bearings 115 together with the two X-direction guide shafts 113 and the Y-direction guide shaft 112. Accordingly, the two X-direction guide shafts 113 constitute a first support device and the Y-direction guide shaft 112 constitute a second support device.

The image pickup device 105 is fixed to a front surface (surface facing toward the object side) of the printed board 120 via the base plate 130. A holder 131, which is in the shape of a hollow prism, is fixed to a front surface of the base plate 130 to surround the image pickup device 105 (see FIG. 6). The holder 131 is provided at the front end thereof with a rectangular opening 131a. The opening 131a is formed to have a shape and size which prevent the light bundle of an object, which is projected on the imaging surface 105a of the image pickup device 105, from being intercepted by the opening 131a.

An optical low-pass filter 134 is provided in the internal space of the holder 131 so that the outer edge of the optical low-pass filter 134 abuts against an inner peripheral surface of the holder 131 which defines the rectangular opening 131a. A pressure member (sealing member) 133 having an annular shape in a front elevation is sandwiched between the optical low-pass filter 134 and the perimeter of the imaging surface 105a of the image pickup device 105 to make the space therebetween airtight.

The stationary board 110 is provided with a hole 110a, and the holder 131 passes through the square receiving hole 110a without contacting the stationary board 110. The hole 110a is formed so as to have either a size which limits the range of movement of the holder 131 during the image shake correcting operation of the image shake correction stage apparatus or a size greater than the range of movement of the holder 131 in the image shake correcting operation of the image shake correction stage apparatus.

The holder 131 is provided at upper and lower ends thereof with an upper X-direction guide portion 135 and a lower X-direction guide portion 136. The two X-direction guide shafts 113 pass through a bearing hole of the upper X-direction guide portion 135 and a bearing hole of the lower X-direction guide portion 136, respectively, in the X-direction to be supported thereby in a freely slidable manner.

The printed board 120 is fixed to a rear surface of the base plate 130. The printed board 120 is provided with a large number of conductor wires (not shown) to which terminals of the image pickup device 105 are electrically connected. The printed board 120 is provided with three projecting tongues 120a, 120b and 120c which project outwards in three different directions from a central portion of the base plate 130 to which the image pickup device 105 is mounted. A planar X-direction drive coil (drive coil) CX and a planar Y-direction drive coil (drive coil) CY are printed on flat surfaces of the two projecting tongues 120a and 120b, respectively, which are parallel to the printed board 120.

The light source 21 is fixed to a front surface of the projecting tongue 120c. The two-dimensional position sensor 11 is fixed to the stationary board 110 at a position facing the light source 21. The structures of the light source 21, the lens holder 31 and the two-dimensional position sensor 11 and the positional relationship therebetween are the same as those shown in FIG. 1. [2] Lead wires of the light source 21 are electrically connected with associated lead wires of the printed board 120, and each wire of the light source 21 is wired so as not to interfere with movement (linear and rotational movement) of the printed board 120 via a flexible printed wiring board (flexible PWB) (not shown), to be electrically connected to a circuit board provided in the body of the digital camera 101. The operation of the LED 22 of the light source 21 is controlled via the above-mentioned wiring connections and via which the X-direction drive coil CX and the Y-direction drive coil CY are also energized.

As shown in FIG. 5, each of the X-direction drive coil CX and the Y-direction drive coil CY is rectangularly coiled and is defined by linear right sides, linear left sides, linear upper sides and linear lower sides. Although the X-direction drive coil CX and the Y-direction drive coil CY have several turns in the drawings, these are several scores of turns in reality. The opposite ends of the X-direction drive coil CX and the opposite ends of the Y-direction drive coil CY are connected to two independent coil drive circuits (not shown), respectively.

An X-direction yoke YX and a Y-direction yoke YY are secured to the rear surface of the stationary board 110 at two points thereon. The two yoke members YX and YY are made of a magnetic material, such as a metal plate, and are U-shaped in cross section. The two yoke members YX and YY are provided with an X-direction magnet MX and a Y-direction magnet MY which are magnetically stuck to rear inner surfaces of the front ends of the two yoke members YX and YY, respectively. The magnet MX of the yoke member YX includes an N-pole and an S-pole which are aligned in the X-direction, and the magnet MY of the yoke member YY includes an N-pole and an S-pole which are aligned in the Y-direction. The rear end of the yoke member YY is opposed to the magnet MY to form a magnetic circuit (Y-direction actuator) including magnetic field lines concentrated therebetween, together with the magnet MY (see FIG. 6). Likewise, the rear end of the yoke member YX is opposed to the magnet MX to form a similar magnetic circuit (X-direction actuator), together with the magnet MX. The projecting tongue 120a of the printed board 120 is located between the rear end of the yoke member YY and the magnet MY to be freely movable in the X-direction without contacting either the rear end of the yoke member YY or the magnet MY, while the projecting tongue 120b of the printed board 120 is located between the rear end of the yoke member YX and the magnet MX without contacting either the rear end of the yoke member YX or the magnet MX.

A moving body including the X-Y direction guide shaft 111, the printed board 120, the base plate 130, the holder 131, the optical low-pass filter 134, the pressure member 133 and the image pickup device 105, and the aforementioned flexible printed wiring board (not shown) are configured so that the center of the imaging surface 105a of the image pickup device 105 is coincident with the optical axis O in a neutral state (initial state) in which neither of the drive coils CX and CY is energized.

If the X-direction drive coil CX is energized via the associated coil drive circuit, the image pickup device 105, the printed board 120 and the base plate 130 move in the X-direction along the two X-direction guide shafts 113. If the Y-direction drive coil CY is energized via the associated coil drive circuit, the image pickup device 105, the printed board 120, the base plate 130 and the X-Y direction guide shaft 111 move in the Y-direction.

In the image shake correction stage apparatus which incorporates the two-dimensional position detecting device including the light source 21 and the two-dimensional position sensor 11, the arithmetic control circuit 41 calculates a drive speed and a drive distance in the X-direction and a drive speed and a drive distance in the Y-direction in accordance with vertical and horizontal angular velocities detected by the vertical/horizontal angular velocity sensor, and supplies electrical currents to the X-direction drive coil CX and the Y-direction drive coil CY in accordance with the calculated drive speeds and drive distances to move the printed board 120 in the X-direction and the Y-direction, respectively. This movement of the printed board 120 causes the secondary light-source image 24*i* (which is focused on the light receiving surface of the two-dimensional position sensor 11) to move, thus causing the detection signal output from the two-dimensional position sensor 11 to vary. Based on this variation of the detection signal, the arithmetic control circuit 41 detects the position of the printed board 120 relative to the stationary board 110 and controls the power supplying operation to the X-direction drive coil CX and the Y-direction drive coil CY.

Since an optical system (the lens L) of the two-dimensional position detecting device for detecting the position of the printed board 120 (the movable stage) is formed as a reducing projector optical system in the above illustrated embodiment of the two-dimensional position detecting device, the moving range of the movable stage in which the position of the movable stage is detectable is enlarged. Therefore, due to the utilization of a two-dimensional position sensor, the light receiving surface of which is difficult to be enlarged, the position of the movable stage can be detected in a two-dimensional moving range which is larger than the light receiving surface of the two-dimensional position sensor.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A two-dimensional position detecting device comprising:
    a movable member which moves parallel relative to a stationary member;
    a light source and a two-dimensional position sensor which are each fixed to one of said stationary member and said movable member, respectively, said two-dimensional position sensor receiving light emitted from said light source to detect a light-receiving point on a light receiving surface of said two-dimensional position sensor; and
    a reducing projector optical system, positioned between said light source and said two-dimensional position sensor, for converging light that is emitted from said light source towards said light receiving surface of said two-dimensional position sensors,
    wherein said movable member comprises a movable stage of an image shake correction stage apparatus, and
    wherein said movable stage is supported by a first support device so as to allow said movable stage to move in one of two directions perpendicular to each other relative to said stationary member, and wherein said movable stage is further supported by said stationary member through a second support device so as to allow said first support device and said movable stage to integrally move linearly in the other of said two directions.

2. The two-dimensional position detecting device according to claim 1, wherein said reducing projector optical system comprises an imaging lens positioned so that a distance between said imaging lens and said light source is greater than a distance between said imaging lens and said two-dimensional position sensor.

3. The two-dimensional position detecting device according to claim 1, wherein said reducing projector optical system comprises an imaging lens and an adjuster for moving said image lens within a moving range for focus adjustment.

4. The two-dimensional position detecting device according to claim 3, wherein said adjuster comprises two hollow-cylindrical members,
    wherein one of said two hollow-cylindrical members is fixed to said two-dimensional position sensor and the other of said two hollow-cylindrical members supports said imaging lens; and
    wherein a position of said imaging lens in the optical axis direction of said imaging lens is adjusted via a sliding movement between said one and said other of said two hollow-cylindrical members.

5. The two-dimensional position detecting device according to claim 3, wherein said adjuster comprises two hollow-cylindrical members which are engaged with each other via male and female helicoidal threads,
    wherein one of said two hollow-cylindrical members is fixed to said two-dimensional position sensor and the other of said two hollow-cylindrical members supports said imaging lens; and
    wherein a position of said imaging lens in the optical axis direction of said imaging lens is adjusted via a relative rotational movement between said one and said other of said two hollow-cylindrical members.

6. The two-dimensional position detecting device according to claim 1, wherein said image shake correction stage apparatus is part of a digital camera.

7. The two-dimensional position detecting device according to claim 6, wherein said camera comprises:
    an X-direction actuator which moves said movable stage in said one of said two directions relative to said stationary member;
    a Y-direction actuator which moves said first support device and said movable stage in said other of said two directions relative to said stationary member; and
    a controller for driving said X-direction actuator and said Y-direction actuator in accordance with an output of said two-dimensional position sensor to stabilize an object image which is formed on an image pickup device through a photographing optical system of said digital camera.

8. The two-dimensional position detecting device according to claim 1, wherein said first support device and said second support device comprise a substantially U-shaped guide shaft which includes a guide shaft extending in said other of said two directions and two parallel guide shafts extending in said one of said two directions.

9. A two-dimensional position detecting device comprising:
    a movable member which moves parallel relative to a stationary member;
    a light source and a two-dimensional position sensor which are each fixed to one of said stationary member and said movable member, respectively, said two-dimensional position sensor receiving light emitted from said light source to detect a light-receiving point on a light receiving surface of said two-dimensional position sensor; and
    a reducing projector optical system, positioned between said light source and said two-dimensional position sensor, for converging light that is emitted from said light source towards said light receiving surface of said two-dimensional position sensor,
    wherein said reducing projector optical system comprises an imaging lens and an adjuster for moving said image lens within a moving range for focus adjustment,
    wherein said adjuster comprises two hollow-cylindrical members,
    wherein one of said two hollow-cylindrical members is fixed to said two-dimensional position sensor and the other of said two hollow-cylindrical members supports said imaging lens; and
    wherein a position of said imaging lens in the optical axis direction of said imaging lens is adjusted via a sliding movement between said one and said other of said two hollow-cylindrical members.

10. The two-dimensional position detecting device according to claim 9,
    wherein said reducing projector optical system comprises an imaging lens positioned so that a distance between said imaging lens and said light source is greater than a distance between said imaging lens and said two-dimensional position sensor.

11. The two-dimensional position detecting device according to claim 9,
    wherein said movable member comprises a movable stage of an image shake correction stage apparatus, and
    wherein said movable stage is supported by a first support device so as to allow said movable stage to move in one of two directions perpendicular to each other relative to said stationary member, and wherein said movable stage is further supported by said stationary member through a second support device so as to allow said first support device and said movable stage to integrally move linearly in the other of said two directions.

12. The two-dimensional position detecting device according to claim 11, wherein said image shake correction stage apparatus is part of a digital camera.

13. The two-dimensional position detecting device according to claim 12, wherein said camera comprises:
    an X-direction actuator which moves said movable stage in said one of said two directions relative to said stationary member;
    a Y-direction actuator which moves said first support device and said movable stage in said other of said two directions relative to said stationary member; and
    a controller for driving said X-direction actuator and said Y-direction actuator in accordance with an output of said two-dimensional position sensor to stabilize an object image which is formed on an image pickup device through a photographing optical system of said digital camera.

14. A two-dimensional position detecting device comprising:
    a movable member which moves parallel relative to a stationary member;
    a light source and a two-dimensional position sensor which are each fixed to one of said stationary member and said movable member, respectively, said two-dimensional position sensor receiving light emitted from said light source to detect a light-receiving point on a light receiving surface of said two-dimensional position sensor; and
    a reducing projector optical system, positioned between said light source and said two-dimensional position sensor, for converging light that is emitted from said light source towards said light receiving surface of said two-dimensional position sensor,
    wherein said reducing projector optical system comprises an imaging lens and an adjuster for moving said image lens within a moving range for focus adjustment,
    wherein said adjuster comprises two hollow-cylindrical members which are engaged with each other via male and female helicoidal threads,
    wherein one of said two hollow-cylindrical members is fixed to said two-dimensional position sensor and the other of said two hollow-cylindrical members supports said imaging lens; and
    wherein a position of said imaging lens in the optical axis direction of said imaging lens is adjusted via a relative rotational movement between said one and said other of said two hollow-cylindrical members.

15. A two-dimensional position detecting device according to claim 14, wherein said reducing projector optical system comprises an imaging lens positioned so that a distance between said imaging lens and said light source is greater than a distance between said imaging lens and said two-dimensional position sensor.

16. A two-dimensional position detecting device according to claim 14,
    wherein said movable member comprises a movable stage of an image shake correction stage apparatus, and
    wherein said movable stage is supported by a first support device so as to allow said movable stage to move in one of two directions perpendicular to each other relative to said stationary member, and wherein said movable stage is further supported by said stationary member through a second support device so as to allow said first support device and said movable stage to integrally move linearly in the other of said two directions.

17. A two-dimensional position detecting device according to claim 16, wherein said image shake correction stage apparatus is part of a digital camera.

18. A two-dimensional position detecting device according to claim 17, wherein said camera comprises:
    an X-direction actuator which moves said movable stage in said one of said two directions relative to said stationary member;
    a Y-direction actuator which moves said first support device and said movable stage in said other of said two directions relative to said stationary member; and
    a controller for driving said X-direction actuator and said Y-direction actuator in accordance with an output of said two-dimensional position sensor to stabilize an object image which is formed on an image pickup device through a photographing optical system of said digital camera.

* * * * *